(12) United States Patent
Ito et al.

(10) Patent No.: US 11,511,545 B2
(45) Date of Patent: *Nov. 29, 2022

(54) INK JET RECORDING APPARATUS, INK JET RECORDING METHOD, AND INK COMPOSITION

(71) Applicant: Seiko Epson Corporation, Tokyo (JP)

(72) Inventors: Jun Ito, Shimosuwa (JP); Yusuke Mizutaki, Shiojiri (JP); Tomohiro Aruga, Matsumoto (JP); Kiyomi Kumamoto, Shiojiri (JP); Tomoki Maruyama, Matsumoto (JP)

(73) Assignee: SEIKO EPSON CORPORATION

( * ) Notice: Subject to any disclaimer, the term of this patent is extended or adjusted under 35 U.S.C. 154(b) by 48 days.

This patent is subject to a terminal disclaimer.

(21) Appl. No.: 17/035,902

(22) Filed: Sep. 29, 2020

(65) Prior Publication Data

US 2021/0094301 A1    Apr. 1, 2021

(30) Foreign Application Priority Data

Sep. 30, 2019   (JP) .............................. JP2019-179752

(51) Int. Cl.
   *B41J 2/175*      (2006.01)
   *B41M 5/00*       (2006.01)
   (Continued)

(52) U.S. Cl.
   CPC ............. *B41J 2/17506* (2013.01); *B41J 2/01* (2013.01); *B41J 2/17503* (2013.01);
   (Continued)

(58) Field of Classification Search
   CPC ..... C09D 11/326; C09D 11/107; C09D 11/03; C09D 11/037; C09D 11/033; C09D 11/36;
   (Continued)

(56) References Cited

U.S. PATENT DOCUMENTS 5,619,239 A   4/1997  Kotaki et al.
5,745,137 A   4/1998  Scheffelin et al.
(Continued)

FOREIGN PATENT DOCUMENTS

CN         1107103 A     8/1995
CN       102205727 A    10/2011
(Continued)

*Primary Examiner* — Manish S Shah
(74) *Attorney, Agent, or Firm* — Harness, Dickey & Pierce, P.L.C.

(57) ABSTRACT

An ink jet recording apparatus includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with the volume-average particle diameter of the disperse colorant being 110.0 nm or more and 200.0 nm or less, and also contains at least one organic solvent with an SP of 9 or more, with the percentage thereof being 10.0% by mass or more.

9 Claims, 2 Drawing Sheets

(51) Int. Cl.
*C09D 11/107* (2014.01)
*C09D 11/322* (2014.01)
*C09D 11/36* (2014.01)
*B41J 2/01* (2006.01)
*B41J 2/21* (2006.01)

(52) U.S. Cl.
CPC ....... *B41J 2/17509* (2013.01); *B41J 2/17523* (2013.01); *B41J 2/2107* (2013.01); *B41M 5/0023* (2013.01); *C09D 11/107* (2013.01); *C09D 11/322* (2013.01); *C09D 11/36* (2013.01)

(58) Field of Classification Search
CPC ......... C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 5,746,818 A | 5/1998 | Yatake | |
| 6,070,974 A | 6/2000 | Kotaki et al. | |
| 6,145,975 A | 11/2000 | Kotaki et al. | |
| 6,164,772 A | 12/2000 | Koitabashi et al. | |
| 6,243,116 B1 | 6/2001 | Kotaki et al. | |
| 6,505,923 B1 | 1/2003 | Yamamoto et al. | |
| 6,767,075 B1 | 7/2004 | Takada et al. | |
| 6,969,161 B2 | 11/2005 | Kuwabara et al. | |
| 9,067,417 B2 | 6/2015 | Komatsu et al. | |
| 2002/0140750 A1 | 10/2002 | Koshiyama et al. | |
| 2003/0083396 A1* | 5/2003 | Ylitalo | C09D 11/101 522/74 |
| 2005/0012798 A1 | 1/2005 | Adachi et al. | |
| 2006/0203055 A1* | 9/2006 | Doi | C09D 11/54 347/96 |
| 2007/0146454 A1* | 6/2007 | Doi | C09D 11/40 347/100 |
| 2007/0188571 A1* | 8/2007 | Tokita | B41M 5/0017 347/100 |
| 2007/0263054 A1* | 11/2007 | Yatake | C09D 11/326 106/31.86 |
| 2010/0068389 A1 | 3/2010 | Ohzeki et al. | |
| 2010/0302326 A1 | 12/2010 | Morohoshi et al. | |
| 2011/0228629 A1 | 9/2011 | Kawate | |
| 2011/0242206 A1 | 10/2011 | Komatsu et al. | |
| 2012/0249667 A1 | 10/2012 | Hirata et al. | |
| 2012/0293590 A1 | 11/2012 | Yoshida et al. | |
| 2013/0044168 A1* | 2/2013 | Kaga | C09D 11/101 347/102 |
| 2013/0114084 A1 | 5/2013 | Kamiyanagi et al. | |
| 2013/0155160 A1 | 6/2013 | Shiono | |
| 2013/0182057 A1 | 7/2013 | Koase | |
| 2014/0036010 A1 | 2/2014 | Hasegawa et al. | |
| 2014/0084578 A1 | 3/2014 | Yagi et al. | |
| 2014/0125743 A1 | 5/2014 | Aruga | |
| 2014/0240391 A1 | 8/2014 | Goto et al. | |
| 2015/0085034 A1 | 3/2015 | Aruga et al. | |
| 2016/0040022 A1 | 2/2016 | Aruga et al. | |
| 2016/0177116 A1* | 6/2016 | Katsuragi | C08L 75/08 347/102 |
| 2016/0333211 A1* | 11/2016 | Miyajima | C09D 11/54 |
| 2018/0187034 A1 | 7/2018 | Takeno et al. | |
| 2018/0215160 A1 | 8/2018 | Koike et al. | |
| 2019/0023926 A1 | 1/2019 | Kumamoto et al. | |
| 2019/0105903 A1 | 4/2019 | Kimura et al. | |
| 2020/0207136 A1 | 7/2020 | Miyasa et al. | |
| 2020/0361220 A1 | 11/2020 | Kumagai et al. | |

FOREIGN PATENT DOCUMENTS

| | | |
|---|---|---|
| CN | 102794992 A | 11/2012 |
| CN | 103173059 A | 6/2013 |
| CN | 103804992 A | 5/2014 |
| CN | 104245860 A | 12/2014 |
| JP | 2019-019220 A | 2/2019 |
| JP | 2019-069550 A | 5/2019 |

* cited by examiner

INK JET RECORDING APPARATUS, INK JET RECORDING METHOD, AND INK COMPOSITION

The present application is based on, and claims priority from JP Application Serial Number 2019-179752, filed Sep. 30, 2019, the disclosure of which is hereby incorporated by reference herein in its entirety.

BACKGROUND

1. Technical Field

The present disclosure relates to an ink jet recording apparatus, an ink jet recording method, and an ink composition.

2. Related Art

In the field of relatively small ink jet recording apparatuses, such as those for household and office use, there is a demand for increasing the capacity of an ink encasement from which ink is supplied to a recording head and for reducing the overall body size.

Known serial ink jet recording apparatuses use a cartridge, which is of small capacity, or an ink tank, which provides a larger capacity, as a container from which an ink composition is supplied to a recording head. A cartridge is a container that is mounted on a carriage (mechanism that moves a recording head back and forth) together with a recording head, and the user can detach the cartridge from the carriage and attach it again. Cartridges, however, require frequent replacement because of their small capacity.

To address this, JP-A-2019-019220, for example, proposes a large-capacity ink tank. Increasing the capacity of an ink tank helps reduce the frequency of refilling.

A large ink tank, however, is difficult to mount on a carriage. Instead, it supplies the ink composition therein to a recording head through a tube or similar pathway. Increasing the capacity of an ink tank admittedly helps reduce the frequency of refilling, but at the same time can cause the chemical makeup of the ink to alter as a result of accumulated changes caused by, for example, the evaporation of water due to reduced refilling. The altered chemical makeup is difficult to bring back to the initial state, even by refilling.

Even when the freshly prepared ink composition contains well-dispersed dispersible components, alterations over time can cause the dispersible components, e.g., a disperse colorant, to precipitate, occasionally resulting in mottling. Attempts to control the precipitation of the disperse colorant can affect color strength and/or cause heavier bleeding. There is a need for an ink jet recording apparatus superior in the control of colorant precipitation, the color strength of recordings produced, and the prevention of bleeding.

SUMMARY

A form of an ink jet recording apparatus according to an aspect of the present disclosure includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with a volume-average particle diameter of the disperse colorant being 110.0 nm or more and 200.0 nm or less, and also contains at least one organic solvent with an SP of 9 or more, with a percentage thereof being 10.0% by mass or more.

In the above form of an ink jet recording apparatus, the at least one organic solvent with an SP of 9 or more contained in the ink composition may be one or two or more polyhydric alcohols and/or one or two or more alkylene glycol monoalkyl ethers.

In the above form of an ink jet recording apparatus, the ink composition may contain, as the one or two or more polyhydric alcohols, one or two or more polyhydric alcohols having two hydroxyl groups.

In any of the above forms of ink jet recording apparatuses, the ink composition may contain an organic solvent with an SP of 9.9 or more and 13 or less.

In any of the above forms of ink jet recording apparatuses, the disperse colorant may be a self-dispersible colorant.

In any of the above forms of ink jet recording apparatuses, a ratio of a volume of a liquid phase to a volume of a gas phase inside the ink encasement may be 9 or less.

In any of the above forms of ink jet recording apparatuses, a viscosity at 20° C. of the ink composition may be 3.5 mPa·s or more.

A form of an ink composition according to an aspect of the present disclosure contains a disperse colorant, with a volume-average particle diameter of the disperse colorant being 110.0 nm or more and 200.0 nm or less, and also contains at least one organic solvent with an SP of 9 or more, with a percentage thereof being 10.0% by mass or more. The ink composition is for use with an ink jet recording apparatus that includes an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded.

A form of an ink jet recording method according to an aspect of the present disclosure is a recording method in which an ink jet recording apparatus is used that includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with a volume-average particle diameter of the disperse colorant being 110.0 nm or more and 200.0 nm or less, and also contains at least one organic solvent with an SP of 9 or more, with a percentage thereof being 10.0% by mass or more. The method includes ejecting the ink composition from the recording head to attach the ink composition to a recording medium.

DESCRIPTION OF EXEMPLARY EMBODIMENTS

Figure 1:
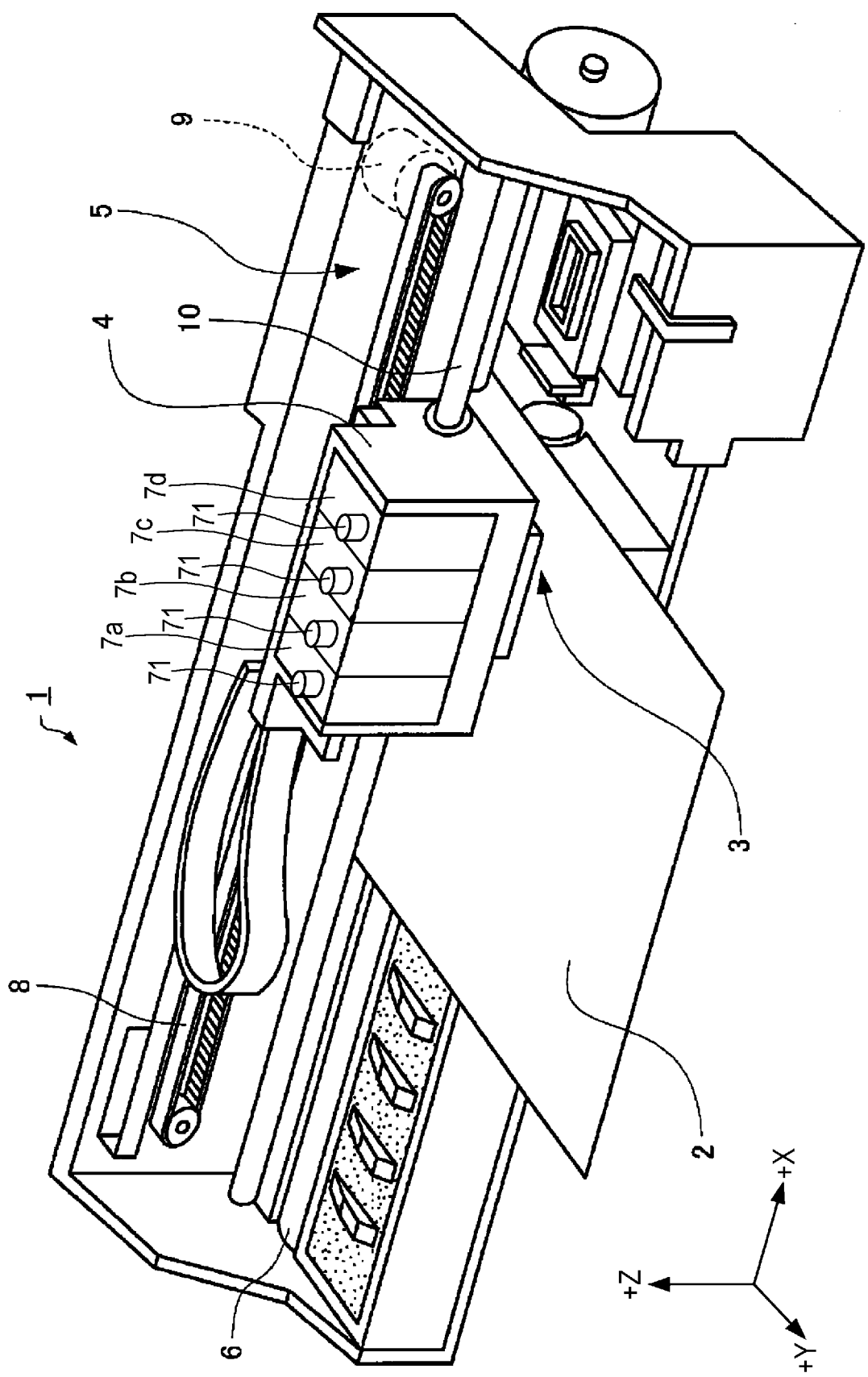
FIG. 1 is an outline perspective diagram illustrating an example of an ink jet recording apparatus according to an embodiment.

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

1. Ink Jet Recording Apparatus

An ink jet recording apparatus according to this embodiment includes an ink composition, an ink encasement in which the ink composition is encased, a recording head that ejects the ink composition, and a carriage configured to move the recording head back and forth.

1.1. Ink Composition

As a component of the ink jet recording apparatus according to this embodiment, the ink composition contains a disperse colorant. The volume-average particle diameter of the disperse colorant is 110.0 nm or more and 200.0 nm or less. The ink composition also contains at least one organic solvent with an SP of 9 or more, with the percentage thereof being 10.0% by mass or more.

1.1.1. Disperse Colorant

Disperse colorants are colorants insoluble in solvents, such as pigments and disperse dyes. Any pigment or dye insoluble or sparingly soluble in solvents can be used. Examples include inorganic pigments, organic pigments, solvent dyes, and disperse dyes. The color of the pigment or dye is not critical either. The color of the pigment or dye may be what is called a process color, such as cyan, magenta, yellow, or black, or may be what is called a spot color, such as white, a fluorescent color, or a glitter color.

Examples of inorganic pigments that can be used include carbon black (C.I. Pigment Black 7) pigments, such as furnace black, lamp black, acetylene black, and channel black, iron oxide, titanium oxide, zinc oxide, and silica.

Examples of carbon black pigments include Mitsubishi Chemical Corporation's No. 2300, 900, MCF88, No. 20B, No. 33, No. 40, No. 45, No. 52, MA7, MA8, MA100, and No. 2200B. Other examples include Degussa's Color Black FW1, FW2, FW2V, FW18, FW200, S150, S160, and S170, Printex 35, U, V, and 140U, and Special Black 6, 5, 4A, 4, and 250, Columbian Carbon's Conductex SC and Raven 1255, 5750, 5250, 5000, 3500, 1255, and 700, Cabot's REGAL 400R, 330R, and 660R, MOGUL L, MONARCH 700, 800, 880, 900, 1000, 1100, 1300, and 1400, and ELFTEX 12, and Orient Chemical Industries Co., Ltd.'s BONJET BLACK CW-1, CW-1S, CW-2, CW-3, and M-800.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Examples of cyan pigments include C.I. Pigment Blue 1, 2, 3, 15:3, 15:4, 15:34, 16, 22, and 60 and C.I. Vat Blue 4 and 60. An example of a preferred cyan pigment is one or a mixture of two or more selected from the group consisting of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, and 202 and C.I. Pigment Violet 19. An example of a preferred magenta pigment is one or a mixture of two or more selected from the group consisting of C.I. Pigment Red 122, 202, and 209 and C.I. Pigment Violet 19.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. An example of a preferred yellow pigment is one or a mixture of two or more selected from the group consisting of C.I. Pigment Yellow 74, 109, 110, 128, and 138.

An orange pigment can be, for example, C.I. Pigment Orange 36 or 43. A mixture of them can also be used. In an aqueous green ink for ink jet recording, a pigment can be C.I. Pigment Green 7 or 36, and a mixture of them can also be used.

A glitter pigment can be any kind of pigment that can glitter on a medium. Examples include metal particles, which are particles of one, or an alloy of two or more, selected from the group consisting of aluminum, silver, gold, platinum, nickel, chromium, tin, zinc, indium, titanium, and copper (alloys also referred to as metallic pigments), and pearl pigments, which have a pearly gloss. Typical examples of pearl pigments include pigments having a pearlescent or interference gloss, such as titanium dioxide-coated mica, pearl essence, and bismuth oxychloride. Glitter pigments that have been surface-treated to be inert with water can also be used.

Examples of white pigments include metal compounds, such as metal oxides, barium sulfate, and calcium carbonate. Examples of metal oxides include titanium dioxide, zinc oxide, silica, alumina, and magnesium oxide. Hollow particles can also be used as a white pigment.

A disperse or solvent dye can be any kind of colorant that does not dissolve but disperses in the ink vehicle. Examples include azo dyes, metal complex azo dyes, anthraquinone dyes, phthalocyanine dyes, and triarylmethane dyes.

Examples of disperse dyes include C.I. Disperse Red 60, 82, 86, 86:1, 167:1, and 279, C.I. Disperse Yellow 64, 71, 86, 114, 153, 233, and 245, C.I. Disperse Blue 27, 60, 73, 77, 77:1, 87, 257, and 367, C.I. Disperse Violet 26, 33, 36, and 57, and C.I. Disperse Orange 30, 41, and 61.

The pigments and dyes listed above are merely examples. One or two or more such pigments or dyes may be used, or even a combination of pigment(s) and dye(s) may be used.

Preferably, the disperse colorant reaches stable dispersion in the ink. For example, a pigment may be rendered self-dispersible through a surface treatment of the pigment particles, such as surface oxidation or sulfonation, with ozone, hypochlorous acid, fuming sulfuric acid, etc. Alternatively, a polymeric dispersant may be used.

The use of a self-dispersible colorant helps further reduce the possibility of the ink composition forming aggregates at a gas-liquid interface, for example inside the ink encasement, thereby helping better the performance of the ink composition in intermittent printing. Self-dispersible colorants, moreover, are superior in color strength for a given particle diameter.

1.1.2. Particle Diameter of the Disperse Colorant

The disperse colorant in the ink composition as a component of the ink jet recording apparatus according to this embodiment has an average particle diameter on a volume basis (D50) (also referred to as "volume-average particle diameter) of 110.0 nm or more and 200.0 nm or less as measured in the ink composition. This equally applies whether one or a combination of two or more of such disperse colorants as listed above is used. Colorants obtained by pulverizing such a disperse colorant as listed above, for example using a bead mill, and dispersing the resulting powder again may also be used. It should be noted that the volume-average particle diameter as mentioned herein is that of the particles of the dispersoid in the ink composition. For example, when a resin dispersant is used to disperse the disperse colorant, the volume-average particle diameter is that of the particles coated with the resin dispersant.

Preferably, the volume-average particle diameter of the disperse colorant in the ink composition is 110.0 nm or more and 170.0 nm or less, more preferably 115.0 nm or more and 150.0 nm or less, even more preferably 115.0 nm or more and 140.0 nm or less. With such a volume-average diameter, the particles of the disperse colorant do not easily precipitate in the ink composition, which helps achieve stable dispersion when the ink composition is used with the ink jet recording apparatus according to this embodiment. Such a volume-average particle diameter also helps prevent, for example, the clogging of the nozzles of the ink jet recording apparatus. The color density of the resulting image, moreover, will be quite satisfactory.

The volume-average particle diameter of the disperse colorant in the ink composition can be measured using a particle size distribution analyzer based on laser diffraction and scattering. An example of such a particle size distribution analyzer is Otsuka Electronics Co., Ltd.'s ELSZ-1000 particle size analyzer. Before measurement, the ink composition may be diluted as needed.

1.1.3. Disperse Colorant Content

Preferably, the disperse colorant content of the ink composition is 2.0% by mass or more and 7.0% by mass or less, more preferably 3.0% by mass or more and 7.0% by mass or less, even more preferably 4.0% by mass or more and 7.0% by mass or less of the total amount of the ink composition. By virtue of the small volume-average particle diameter of the disperse colorant, the ink composition according to this embodiment is strong in color even when having a relatively low disperse colorant concentration of 2.0% by mass.

1.1.4. Organic Solvent(s) With an SP of 9 or More

The ink composition contains at least one organic solvent with an SP of 9 or more, with the percentage thereof being 10.0% by mass or more. A function of the organic solvent with an SP of 9 or more is to improve the wettability of the ink composition on a recording medium, improve the penetration of the ink composition into a recording medium, and to enhance the water retention of the ink composition. Examples of organic solvents include polyhydric alcohols, esters, alkylene glycol ethers, cyclic esters, and nitrogen-containing solvents. Examples of nitrogen-containing solvents include cyclic amides and acyclic amides. Examples of acyclic amides include alkoxyalkylamides.

Examples of organic solvents with an SP of 9 or more (and their SPs according to Hansen's method) include, but are not limited to, methanol (SP: 14.84), ethanol (SP: 11.8), 2-propanol (SP: 12.7), n-propyl alcohol (SP: 11.8), 1,3-butanediol (SP: 14.47), 1,3-propanediol (SP: 14.98), 1,2-hexanediol (SP: 12.1), dipropylene glycol (SP: 12.9), triethylene glycol (SP: 13.5), 2-ethyl-1,3-hexanediol (SP: 11.6), tetraethylene glycol (SP: 12.6), glycerol (SP: 16.7), trimethylolpropane (SP: 14.4), γ-butyrolactone (SP: 14.8), 2-pyrrolidone (γ-butyrolactam) (SP: 14.2), ethylene glycol (SP: 16.11), ethylene glycol monomethyl ether (SP: 11.4), ethylene glycol monoisopropyl ether (SP: 9.2), ethylene glycol monobutyl ether (SP: 9.8), diethylene glycol monomethyl ether (SP: 10.7), diethylene glycol monobutyl ether (SP: 9.5), diethylene glycol dimethyl ether (SP: 9.4), diethylene glycol monohexyl ether (SP: 9.7), propylene glycol (SP: 14.2), propylene glycol monomethyl ether (SP: 10.4), propylene glycol n-propyl ether (SP: 9.8), propylene glycol n-butyl ether (SP: 9.7), propylene glycol monophenyl ether (SP: 9.4), dipropylene glycol monomethyl ether (SP: 9.6), dipropylene glycol monoethyl ether (SP: 10.9), dipropylene glycol n-propyl ether (SP: 9.5), dipropylene glycol n-butyl ether (SP: 9.4), triethylene glycol monomethyl ether (SP: 10.5), triethylene glycol monobutyl ether (SP: 10.0), tripropylene glycol monomethyl ether (SP: 9.1), and tripropylene glycol n-butyl ether (SP: 9.9).

The SP, or solubility parameter, is that according to Hansen's method. In Hansen's method, the SP $\delta$ is calculated from three parameters according to the following equation: $\delta^2 = \delta_d^2 + \delta_p^2 + \delta_h^2$. $\delta_d$, $\delta_p$, and $\delta_h$ are solubility parameters for dispersion forces, dipole-dipole forces, and hydrogen-bonding forces, respectively.

The unit of measurement for the SP is $(cal/cm^3)^{1/2}$. The SP is based on the idea that "two substances alike in intermolecular interactions dissolve well in each other" and was proposed by Dr. Hansen (also referred to as HSP). Since not only can it be estimated by calculation but also it can be determined experimentally or empirically, the SPs of numerous substances are found in the literature. In this embodiment, the SP can be a value derived using Hansen-Solubility HSPiP calculation software.

The ink composition may contain one such organic solvent with an SP of 9 or more alone or two or more in combination. The total percentage of organic solvents with an SP of 9 or more to the ink composition as a whole is 10.0% by mass or more, preferably 12.0% by mass or more, more preferably 17.0% by mass or more. By virtue of containing 10.0% by mass or more organic solvent(s) with an SP of 9 or more, the ink composition penetrates well into a recording medium. Since the disperse colorant has a relatively large particle diameter as mentioned above, the disperse colorant stays long on the surface of the recording medium despite the fast penetration of the ink composition, helping ensure sufficient color strength. The fast penetration of the ink composition also helps limit mixing between ink droplets on the surface of the recording medium, thereby helping prevent bleeding.

There is no particular upper limit to the total percentage of organic solvents with an SP of 9 or more to the ink composition as a whole. The total percentage is 50.0% by mass or less for example, preferably 40.0% by mass or less, more preferably 30.0% by mass or less, even more preferably 20.0% by mass or less.

The ink composition may contain an organic solvent with an SP of less than 9, but preferably a small percentage. It is more preferred that the ink composition contain no such organic solvent. A large amount of organic solvent with an SP of less than 9 tends to make the ink composition strong in color, but on the other hand can lead to poor solubility or aggregation. The ink composition, moreover, tends to penetrate into a recording medium only sluggishly and therefore may easily bleed. The ink composition according to this embodiment is superior in color strength without an organic solvent with an SP of less than 9 by virtue of the use of a disperse colorant having a relatively large volume-average particle diameter. When the ink composition contains an organic solvent with an SP of less than 9, its percentage is 5.0% by mass or less, preferably 2.0% by mass or less, more preferably 1.0% by mass or less, even more preferably 0.5% by mass or less, in particular 0.01% by mass or less.

The ink composition, as stated, only needs to contain at least one organic solvent with an SP of 9 or more. For faster penetration and better storage stability of the ink composition, however, it is preferred that the SP of the organic solvent contained be 9.5 or more, more preferably 9.9 or more, even more preferably 10.0 or more, in particular 11.0 or more. For more effective prevention of bleeding, it is preferred that the SP of the organic solvent contained be 17 or less, more preferably 14 or less, even more preferably 13 or less.

Preferably, the ink composition contains one or two or more polyhydric alcohols and/or one or two or more alkylene glycol monoalkyl ethers as the at least one organic solvent with an SP of 9 or more. It is more preferred that the ink composition contain one or two or more polyhydric alcohols, more preferably one or two or more polyhydric alcohols having two hydroxyl groups. Such kinds of organic solvents help improve the storage stability and ejection stability of the ink composition.

1.1.5. Extra Ingredients

Besides the above ingredients, the ink composition may contain (1) water, (2) a surfactant, and (3) other ingredients.

(1) Water

The ink composition according to this embodiment may contain water. For example, the water can be of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, helps control the development of bacteria and fungi when the ink composition is stored long.

Preferably, the water content is 40% by mass or more, more preferably 45% by mass or more, even more preferably 50% by mass or more of the total amount (100% by mass) of the ink composition. A water content of 40% by mass or more makes the ink composition of relatively low viscosity. As for the upper limit, the water content is preferably 90% by mass or less, more preferably 85% by mass or less, even more preferably 80% by mass or less of the total amount of the ink composition.

(2) Surfactant

A surfactant can be of any kind, but examples include acetylene glycol surfactants, polyoxyalkylene alkyl ether surfactants, fluorosurfactants, silicone surfactants, and amphoteric surfactants. Any surfactant of such types can be used, and a combination can also be used.

Examples of commercially available surfactants that can be used include Surfynol SE, Surfynol 61, Surfynol 104, Surfynol 420, Surfynol 82, Surfynol DF110D, Surfynol 104S, Surfynol 104PG50, Surfynol 420, Surfynol 82, Surfynol MD-20, Surfynol 485, OLFINE E1004, OLFINE E4300, and OLFINE E1010 (trade names, acetylene glycol surfactants, Nissin Chemical Industry), NOIGEN ET-116B, NOIGEN DL-0415, NOIGEN ET-106A, NOIGEN DH-0300, NOIGEN YX-400, and NOIGEN EA-160 (trade names, polyoxyalkylene alkyl ether surfactants, DKS), Newcol 1006 and 1006-AL (trade names, polyoxyalkylene alkyl ether surfactants, Nippon Nyukazai Co., Ltd.), BYK-348 (trade name, a silicone surfactant, BYK Japan KK), EMULGEN 1108 (trade name, a polyoxyalkylene alkyl ether, Kao Corporation), KF-6011, KF-6013, KF-6004, KF-6020, KF-6043, KF-643, KF-640, KF-351A, KF-354L, KF-945, X-22-6191, X-22-4515, KF-6015, KF-6017, and KF-6038 (trade names, polysiloxane surfactants, Shin-Etsu Silicone), and L-720, L-7002, FZ-2123, FZ-2105, L-7604, FZ-2104, FZ-2116, and FZ-2120 (trade names, polysiloxane surfactants, Dow Corning Toray).

Examples of amphoteric surfactants include alkylpyridinium salts, alkyl amino acid salts, and alkyl dimethyl betaines. An amphoteric surfactant can be, for example, a betaine surfactant represented by formula (b-1) below.

$$(R)_p\text{—N—}[L\text{-}(COOM)_q]_r \qquad (b\text{-}1)$$

(In formula (b-1), R represents a hydrogen atom or alkyl, aryl, or heterocyclic group. L represents a linking group with a valency of 2 or more. M represents a hydrogen atom, an alkali metal atom, an ammonium group, a protonated organic amine or nitrogen-containing heterocyclic group, or a quaternary ammonium ion group. When being a counterion for an ammonium ion that involves the N atom in formula (b-1), M represents a non-cationic group. q represents an integer of 1 or more, and r represents an integer of 1 or more and 4 or less. p represents an integer of 0 or more and 4 or less, and p+r is 3 or 4. When p+r is 4, the nitrogen atom N is a component of a quaternary amine. When p is 2 or more, the Rs may be the same or different. When q is 2 or more, the COOMs may be the same or different. When r is 2 or more, the L-(COOM)$_q$s may be the same or different.)

Preferably, the betaine surfactant represented by formula (b-1) above is a compound represented by formula (b-2).

$$(R^1)(R^2)(R^3)N^+\text{—X—COO}^- \qquad (b\text{-}2)$$

(In formula (b-2), $R^1$ to $R^3$ each independently represent a C1 to C20 alkyl group, and X represents a divalent linking group.)

Preferably, the compound represented by formula (b-2) above is the compound represented by formula (b-3) below (myristyl betaine or tetradecyl-N,N-dimethylglycine).

$$(n\text{-}C_{14}H_{29})(CH_3)_2N^+\text{—CH}_2\text{—COO}^- \qquad (b\text{-}3)$$

The surfactant content is preferably 0.01% by mass or more and 2.0% by mass or less, more preferably 0.05% by mass or more and 1.50% by mass or less, even more preferably 0.10% by mass or more and 1.20% by mass or less of the total mass of the ink composition. A surfactant content of 0.01% by mass or more helps, for example, improve ejection stability.

(3) Other Ingredients

Other ingredients that may be contained in the ink composition include pH-adjusting agents, fungicides/preservatives, chelating agents, antirusts, antimolds, antioxidants, antireductants, and drying agents.

Examples of pH-adjusting agents include urea compounds, amines, morpholines, piperazines, and aminoalcohols, such as alkanolamines. Examples of urea compounds include urea, ethylene urea, tetramethylurea, thiourea, and 1,3-dimethyl-2-imidazolidinone. An example of an amine is diethanolamine. pH-adjusting agents help, for example, retard or accelerate the dissolution of impurities from materials forming the channel through which the ink flows, thereby helping adjust the detergency of the ink composition.

Examples of fungicides/preservatives include PROXEL CRL, PROXEL BDN, PROXEL GXL, PROXEL XL2, PROXEL IB, and PROXEL TN (all are trade names; Lonza). Fungicides/preservatives help control fungal and bacterial growth, thereby improving the storage of the ink composition.

Examples of chelating agents include ethylenediaminetetraacetic acid (EDTA) and the nitrilotriacetate, hexametaphosphate, pyrophosphate, and metaphosphate of ethylenediamine.

1.1.6. Viscosity of the Ink Composition

The viscosity of the ink composition is not critical, but preferably the viscosity at 20° C. of the ink composition is 3.0 mPa·s or more and 8.0 mPa·s or less, more preferably 3.5 mPa·s or more and 6.0 mPa·s or less. When the ink composition has a viscosity of 3.5 mPa·s or more at 20° C., the disperse colorant therein precipitates very slowly. This helps keep image quality consistent, for example because the OD of recordings produced with such an ink is not greatly different between immediately after ink loading and after a long time from ink loading. The storage stability of the ink composition is also improved. The viscosity can be measured by, for example, analyzing the ink composition under 20° C. conditions using MCR-300 rheometer (Physica).

The viscosity of the ink composition can be adjusted by, for example, changing at least one of the type(s), combination, and amount(s) of at least one of water, organic solvent(s), and surfactant(s).

1.1.7. Use of the Ink Composition

As stated, this ink composition contains a disperse colorant, with the volume-average particle diameter of the colorant being 110.0 nm or more and 200.0 nm or less. This ink composition, furthermore, is for use with an ink jet recording apparatus that includes the ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The following describes an ink jet recording apparatus according to this embodiment.

1.2. Structure of the Ink Jet Recording Apparatus

An ink jet recording apparatus according to this embodiment includes an ink composition as described above. The following outlines its structure excluding the ink composition by taking an ink jet recording apparatus 1 as an example. The ink jet recording apparatus 1 includes an ink composition, an ink encasement 7 in which the ink composition is encased, a recording head 3 that ejects the ink composition, and a carriage 4 configured to move the recording head 3 back and forth. The carriage 4 carries the ink encasement 7, with the ink encasement 7 integrated with the carriage 4. The ink encasement 7 has an ink fill port 71 that opens and shuts as a port through which the ink composition is loaded. In the drawings referenced in the following description, the scale may vary from element to element so that each element is recognizable.

The recording head 3 is an ink composition ejector, i.e., a component that ejects tiny droplets of the ink composition. Using this recording head 3, the ink jet recording apparatus 1 attaches droplets to a recording medium 2. FIG. 1 is an outline perspective diagram illustrating the ink jet recording apparatus 1.

As illustrated in FIG. 1, the ink jet recording apparatus 1 has a recording head 3, a carriage 4, a main scanning mechanism 5, a platen roller 6, and a control unit (not illustrated) that controls the overall operation of the ink jet recording apparatus 1. The carriage 4 carries the recording head 3 and ink encasements 7a, 7b, 7c, and 7d in which ink compositions to be supplied to the recording head 3 are contained. That is, the carriage 4 moves the recording head 3 back and forth and carries ink encasements 7a, 7b, 7c, and 7d, with the ink encasements 7a, 7b, 7c, and 7d integrated with the carriage 4. The illustrated ink encasements 7a, 7b, 7c, and 7d each represent an example of an ink encasement 7.

The ink encasements 7a, 7b, 7c, and 7d are immobilized and cannot be detached from the carriage 4 by the user. That is, the carriage 4 carries an ink encasement 7 integrated therewith. The integration between the carriage 4 and the ink encasement 7 may be achieved by producing the ink encasement 7 separately from the carriage 4 and screwing, gluing with an adhesive agent, or otherwise fastening it to the carriage 4, or may be achieved by monolithically forming the carriage 4 and the ink encasement 7. With the ink encasements 7a, 7b, 7c, and 7d immobilized on the carriage 4, the user can access their ink fill port 71, which opens and shuts, to fill, refill, etc., the ink encasements 7a, 7b, 7c, and 7d with ink compositions. The details of the ink encasement 7 will be discussed later herein.

The main scanning mechanism 5 has a timing belt 8 coupled to the carriage 4, a motor 9 that drives the timing belt 8, and a guide shaft 10. The guide shaft 10 extends in the direction in which the carriage 4 moves, or in the main scanning direction, and serves as a support for the carriage 4. The carriage 4 is driven by the motor 9 via the timing belt 8 to move back and forth along the guide shaft 10. In this way, the main scanning mechanism 5 moves the carriage 4 back and forth in the main scanning direction.

The platen roller 6 transports a recording medium 2, on which a record is produced, in a sub-scanning direction perpendicular to the main scanning direction, or along the length of the recording medium 2. The recording medium 2 is therefore transported in the sub-scanning direction. The carriage 4 moves back and forth in the main scanning direction with the recording head 3 and ink encasements 7a, 7b, 7c, and 7d thereon, and the main scanning direction is substantially identical to the direction along the width of the recording medium 2. As a result, the recording head 3 moves in the main and sub-scanning directions relative to the recording medium 2.

The ink encasements 7a, 7b, 7c, and 7d are four independent ink encasements. The same or different ink compositions can be encased in the ink encasements 7a, 7b, 7c, and 7d. These ink encasements separately contain ink compositions, for example in the colors of black, cyan, magenta, and yellow, and can be used in any combination. The number of ink encasements does not need to be four as illustrated in FIG. 1. On the bottom of the ink encasements 7a, 7b, 7c, and 7d is a supply port (hidden in FIG. 1) through which the ink composition contained is supplied to the recording head 3. By virtue of integration with the carriage 4, the ink encasements 7a, 7b, 7c, and 7d, unlike cartridges, do not expose their supply port to the outside. This helps reduce contamination through the supply port, such as air entrainment.

The recording head 3 ejects ink compositions supplied from the ink encasements 7a, 7b, 7c, and 7d and attaches them to a recording medium 2 through multiple nozzles under the control of the control unit (not illustrated). On its surface facing the recording medium 2 to which the ink compositions are attached, the recording head 3 has multiple nozzles (hidden in FIG. 1) through which it ejects the ink compositions and attaches them to the recording medium 2. These multiple nozzles are lined up to form nozzle lines, and there are separate nozzle lines for ink compositions in different colors. Each ink composition is supplied from an ink encasement to the recording head 3 and ejected as droplets through the nozzles by the action of actuators (not illustrated) provided inside the recording head 3. The ejected droplets of ink compositions land on the recording medium 2, forming an image, text, a pattern, an expression of colors, etc., of the ink compositions on the recording medium 2.

The recording head 3 uses piezoelectric elements as driving actuators, but this is not the only possible mode of driving. For example, the actuators may be electromechanical transducers, which displace a diaphragm as an actuator using electrostatic attraction, or electrothermal transducers, which eject droplets of an ink composition using bubbles generated by heating.

In the X-Y-Z coordinate system illustrated in FIG. 1, the X direction is the direction in which the recording head 3 and ink encasements 7a, 7b, 7c, and 7d move (i.e., the direction in which the carriage 4 moves) and at the same time is along the width of the ink jet recording apparatus 1. The Y direction represents the direction along the depth of the ink jet recording apparatus 1 (i.e., the direction in which the recording medium 2 moves), and the Z direction represents the direction along the height of the ink jet recording apparatus 1. In FIG. 1, the +Y direction is toward the front of the ink jet recording apparatus 1, whereas the −Y direction is toward the back or rear of the ink jet recording apparatus 1. In the front view of the ink jet recording apparatus 1, the direction toward the right is the +X direction, and that toward the left is the −X direction. The +Z direction is toward the top (including the upper portion, the top surface, etc.) of the ink jet recording apparatus 1, and the −Z direction is toward the bottom (including the lower portion, the bottom surface, etc.) of the ink jet recording apparatus 1.

1.3. Ink Encasement

Figure 2:
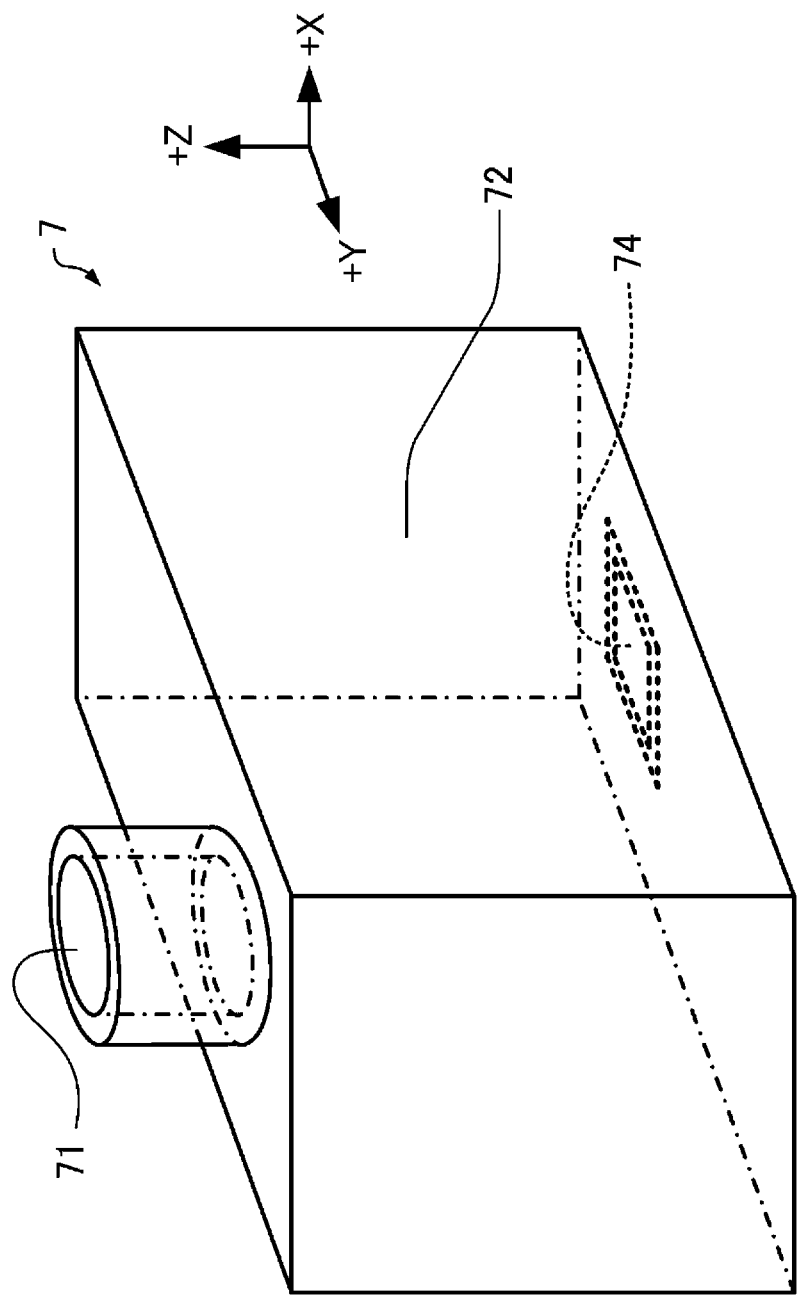
FIG. 2 is a perspective diagram schematically illustrating an ink encasement according to an embodiment.

This ink jet recording apparatus 1 has four ink encasements, ink encasements 7a, 7b, 7c, and 7d, and all of them have an ink fill port 71 that opens and shuts as a port through which an ink composition is loaded. In the following, an ink encasement 7 that can be used as any of the ink encasements 7a, 7b, 7c, and 7d is described with reference to FIG. 2. FIG. 2 is a perspective diagram schematically illustrating the ink encasement 7. In the X-Y-Z coordinate system illustrated in FIG. 2, the X direction is the direction in which the recording head 3 and ink encasement 7 move (i.e., the direction in which the carriage 4 moves).

1.3.1. Shape and Other Details of the Ink Encasement

The ink encasement 7 has at least an ink fill port 71 that opens and shuts as a port through which an ink composition is loaded. In the example illustrated in FIG. 2, the ink encasement 7 has an ink fill port 71, an encasing chamber 72, and an ink discharge port 74.

The encasing chamber 72 encases an ink composition. The encasing chamber 72 has a substantially rectangular parallelepiped shape, defined by the encasement's frame. The walls that define the encasing chamber 72 are of, for example, a shaped plastic article or film. Preferably, the walls that define the encasing chamber 72 are of polypropylene. The schematic in FIG. 2 assumes that the encasement's frame has no thickness. The encasing chamber 72 and the frame can be in any shape as long as the ink encasement 7 can encase and eject an ink composition and can be immobilized on the carriage 4. For example, the ink encasement 7 may have inside the encasing chamber 72 a component that reinforces the structural strength of its frame, such as ribs or a pillar.

The ink encasement 7 is narrow in the X direction, and the X direction is identical to the direction in which the carriage 4 moves (main scanning direction). As the carriage 4 moves, the ink encasement 7 thereon is rocked in the X direction. The width, in the X direction, of the ink encasement 7 is 1 cm or more and 10 cm or less for example, preferably 2 cm or more and 7 cm or less. When the ink encasement 7 has such a width, in the X direction, the maximum width, in the X direction, of the encasing chamber 72 can be 0.6 cm or more, preferably 1.6 cm or more.

The capacity of the encasing chamber 72 is greater than that of ordinary ink cartridges. For example, the encasing chamber 72 has a capacity of 10 mL or more and 500 mL or less, preferably 20 mL or more and 300 mL or less, more preferably 30 mL or more and 200 mL or less, even more preferably 50 mL or more and 200 mL or less.

As stated, the ink encasement 7 is rocked as the carriage 4 moves. Designing the ink encasement 7 and the encasing chamber 72 with such dimensions as given above ensures that this rocking motion shakes and stirs the encased ink composition.

The encasing chamber 72 communicates with the ink fill port 71 and the ink discharge port 74. The ink fill port 71 is an opening that communicates with the encasing chamber 72. The ink fill port 71 is above the encasing chamber 72 (up in the Z direction). The ink fill port 71 has a lid not illustrated. The lid opens and shuts, and is manipulated, for example by the user, when the ink encasement 7 is refilled with the ink composition or for other needs. A check valve, which automatically opens and shuts, in a passage through which the ink composition flows cannot be the lid.

The ink discharge port 74 is an opening that communicates with the encasing chamber 72. The ink discharge port 74 is below the encasing chamber 72 (down in the Z direction). The ink discharge port 74 is an opening through which the ink composition encased in the encasing chamber 72 is discharged toward the recording head 3. The ink discharge port 74 has a filter 80, which is described later herein.

The ink composition is introduced through the ink fill port 71 into the encasing chamber 72 and discharged through the ink discharge port 74. An ink composition introduced into the encasing chamber 72 accumulates in the lower portion (down in the Z direction) by the action of the force of gravity, with a gas in the upper portion (up in the Z direction). When an ink composition is ejected from the recording head 3 in a recording job performed using the ink jet recording apparatus 1, an appropriate volume, based on the volume that should be ejected, of the ink composition is discharged through the ink discharge port 74. The ink encasement 7 may have components like an opening or valve that regulates the pressure inside its encasing chamber 72 and/or a detector that detects the amount of ink composition inside.

Preferably, the ink composition comes into contact with the material forming the encasing chamber 72 at an angle of 45° or less. More preferably, the angle of contact between the ink composition and the material forming the encasing chamber 72 is 40° or less, even more preferably 35° or less. An angle of contact of 45° or less is advantageous in that it prevents air entrainment, especially in initial loading, thereby helping avoid air bubbles in the ink composition.

The encasing chamber 72 encases an ink composition, and there is a preferred range for the amount of ink composition encased. That is, when the ratio of the volume of the liquid phase to that of the gas phase inside the ink encasement is 9 or less, the encased ink composition is rocked and stirred with great efficiency when the carriage moves during main scans. Although the ink composition contains a disperse colorant having a large average particle diameter, efficient rocking and stirring advantageously limits the precipitation and promotes the re-dispersion of the colorant. The liquid phase is the phase of the ink composition, and the gas phase is the phase of air or volatile components in a closed ink encasement. Preferably, the ratio of the volume of the liquid phase to that of the gas phase inside the ink encasement is 5.7 or less, more preferably 5.0 or less, even more preferably 4.5 or less, in particular 4.0 or less; the rocking and stirring process becomes more efficient with decreasing proportion of the ink composition as the liquid phase. It is more preferred that the ratio of the volume of the liquid phase to that of the gas phase inside the ink encasement be in any such range even when the ink encasement is full. Being full in this context means that the ink encasement has been loaded to its full capacity with ink from an ink bottle by the user in an ordinary way.

Preferably, the ratio of the volume of the liquid phase to that of the gas phase inside the encasing chamber 72 is 9 or less, more preferably 5.7 or less, even more preferably 5.0 or less, still more preferably 4.5 or less. Even with a component like ribs or a pillar therein, the continuous space inside the ink encasement 7 through which the ink composition flows can be deemed as the encasing chamber 72.

1.4. Operations and Effects

The ink jet recording apparatus according to this embodiment has the "on-carriage" configuration, which means an ink encasement is immobilized on a carriage. By virtue of this, as the carriage moves during main scans, the ink composition encased in the ink encasement thereon is rocked and stirred. The precipitation of the disperse colorant in the ink composition is therefore limited. This relatively mild precipitation of the disperse colorant also allows for great flexibility in designing the ink composition itself. Since the colorant has a relatively large particle diameter, furthermore, the ink composition is strong in color. By virtue of the strong color of the disperse colorant, bleeding can also be prevented by selecting highly penetrating solvent(s). Overall, the ink jet recording apparatus according to this embodiment achieves a good balance between the control of colorant precipitation, color strength, and the prevention of bleeding.

2. Ink Jet Recording Method

An ink jet recording method according to this embodiment is a recording method in which an ink jet recording apparatus as described above is used. The ink jet recording apparatus therefore includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with the volume-average particle diameter of the disperse colorant being 110.0 nm or more and 200.0 nm or less, and also contains at least one organic solvent with an SP of 9 or more, with the percentage thereof being 10.0% by mass or more. The method includes ejecting the ink composition from the recording head to attach the ink composition to a recording medium.

The recording medium can be of any kind. It may have a recording surface that absorbs the ink composition or may have no such recording surface. Any kind of recording medium can therefore be used. Examples include paper, film, cloth, metal, glass, and polymers.

3. Examples and Comparative Examples

The following describes an aspect of the present disclosure in detail by providing examples, but no aspect of the disclosure is limited to these Examples. In the following, "parts" and "%" are by mass unless stated otherwise.

3.1. Preparation of Ink Compositions

Table 1 summarizes the formulae of the ink compositions of Examples and Comparative Examples. Each ink composition was prepared by mixing the ingredients specified in Table 1, stirring them for 30 minutes or longer, and filtering the mixture. The mixing of the ingredients was by adding the materials one by one to a container equipped with a mechanical stirrer and then stirring and mixing the materials. The resulting mixture was filtered to complete the ink composition of the Example or Comparative Example (Examples 1 to 11 and Comparative Examples 1 to 5). In Table 1, the numerical values representing the amounts of ingredients are in the unit of % by mass.

TABLE 1

| | | Examples | | | | | |
| --- | --- | --- | --- | --- | --- | --- | --- |
| | | 1 | 2 | 3 | 4 | 5 | 6 |
| Black pigment | Form of dispersion | Self-dispersible | Self-dispersible | Self-dispersible | Self-dispersible | Self-dispersible | Self-dispersible |
| | Volume-average particle diameter (nm) | 115 | 140 | 170 | 200 | 140 | 140 |
| | Pigment concentration | 6.0 | 6.0 | 6.0 | 6.0 | 6.0 | 6.0 |
| Organic solvents with an SP of 9 or more | Glycerol | 10.0 | 10.0 | 10.0 | 10.0 | 10.0 | 10.0 |
| | Triethylene glycol | 5.0 | 5.0 | 5.0 | 5.0 | 5.0 | 5.0 |
| | 1,2-Hexanediol | 2.0 | 2.0 | 2.0 | 2.0 | — | — |
| | Diethylene glycol monomethyl ether | — | — | — | — | — | 2.0 |
| | Triethylene glycol monobutyl ether | — | — | — | — | — | — |
| | Diethylene glycol monohexyl ether | — | — | — | — | — | — |
| Surfactant | Surfynol 104 | 1.0 | 1.0 | 1.0 | 1.0 | 1.0 | 1.0 |
| Water | Purified water | Balance | Balance | Balance | Balance | Balance | Balance |
| | Encasement position | ON | ON | ON | ON | ON | ON |
| | Initial viscosity (mPa · s) | >3.5 | >3.5 | >3.5 | >3.5 | >3.5 | >3.5 |
| | Liquid-phase volume/ gas-phase volume | 5.7 | 5.7 | 5.7 | 5.7 | 5.7 | 5.7 |

TABLE 1-continued

| Test results | Image quality | A | A | A | A | A | A |
|---|---|---|---|---|---|---|---|
| | % Decrease in absorbance | A | A | A | A | A | A |
| | Initial OD | A | A | A | A | A | A |
| | Bleeding | A | A | A | A | B | A |
| | Storage stability | A | A | A | A | A | A |
| | Intermittent printing | A | A | A | A | A | A |

| | | Examples | | | | | |
|---|---|---|---|---|---|---|---|
| | | 7 | 8 | 9 | 10 | 11 | 12 |
| Black pigment | Form of dispersion | Self-dispersible | Self-dispersible | Resin-dispersed | Self-dispersible | Self-dispersible | Self-dispersible |
| | Volume-average particle diameter (nm) | 140 | 140 | 140 | 140 | 140 | 140 |
| | Pigment concentration | 6.0 | 6.0 | 6.0 | 6.0 | 6.0 | 6.0 |
| Organic solvents with an SP of 9 or more | Glycerol | 10.0 | 10.0 | 7.0 | 10.0 | 7.0 | 7.0 |
| | Triethylene glycol | 5.0 | 5.0 | 5.0 | 5.0 | 5.0 | — |
| | 1,2-Hexanediol | — | — | 2.0 | 2.0 | — | 2.0 |
| | Diethylene glycol monomethyl ether | — | — | — | — | 5.0 | — |
| | Triethylene glycol monobutyl ether | 2.0 | — | — | — | 5.0 | 2.0 |
| | Diethylene glycol monohexyl ether | — | 2.0 | — | — | — | — |
| Surfactant | Surfynol 104 | 1.0 | 1.0 | 1.0 | 1.0 | 1.0 | 1.0 |
| Water | Purified water | Balance | Balance | Balance | Balance | Balance | Balance |
| | Encasement position | ON | ON | ON | ON | ON | ON |
| | Initial viscosity (mPa · s) | >3.5 | >3.5 | >3.5 | >3.5 | >3.5 | >3.5 |
| | Liquid-phase volume/gas-phase volume | 5.7 | 5.7 | 5.7 | 9.0 | 5.7 | 5.7 |
| Test results | Image quality | A | A | A | A | A | A |
| | % Decrease in absorbance | A | A | A | B | A | A |
| | Initial OD | A | A | A | A | A | A |
| | Bleeding | A | A | A | A | A | A |
| | Storage stability | A | B | A | A | A | A |
| | Intermittent printing | A | A | B | A | A | A |

| | | Examples | | Comparative Examples | | | |
|---|---|---|---|---|---|---|---|
| | | 13 | 14 | 1 | 2 | 3 | 4 |
| Black pigment | Form of dispersion | Self-dispersible | Self-dispersible | Self-dispersible | Self-dispersible | Self-dispersible | Self-dispersible |
| | Volume-average particle diameter (nm) | 140 | 140 | 100 | 230 | 140 | 140 |
| | Pigment concentration | 6.0 | 6.0 | 6.0 | 6.0 | 6.0 | 6.0 |
| Organic solvents with an SP of 9 or more | Glycerol | — | 3.0 | 10.0 | 10.0 | 10.0 | 5.0 |
| | Triethylene glycol | 15.0 | 10.0 | 5.0 | 5.0 | 5.0 | 2.5 |
| | 1,2-Hexanediol | — | 10.0 | 2.0 | 2.0 | 2.0 | 2.0 |
| | Diethylene glycol monomethyl ether | 2.0 | — | — | — | — | — |
| | Triethylene glycol monobutyl ether | — | — | — | — | — | — |
| | Diethylene glycol monohexyl ether | — | — | — | — | — | — |

TABLE 1-continued

| | | | | | | | |
|---|---|---|---|---|---|---|---|
| Surfactant | Surfynol 104 | 1.0 | 1.0 | 1.0 | 1.0 | 1.0 | 1.0 |
| Water | Purified water | Balance | Balance | Balance | Balance | Balance | Balance |
| | Encasement position | ON | ON | ON | ON | OFF | ON |
| | Initial viscosity (mPa · s) | >3.5 | <3.5 | >3.5 | >3.5 | >3.5 | >3.5 |
| | Liquid-phase volume/ gas-phase volume | 5.7 | 5.7 | 5.7 | 5.7 | 5.7 | 5.7 |
| Test results | Image quality | A | B | A | C | D | A |
| | % Decrease in absorbance | A | B | A | C | D | A |
| | Initial OD | A | A | C | A | A | A |
| | Bleeding | A | A | A | A | A | C |
| | Storage stability | A | A | A | A | A | A |
| | Intermittent printing | B | A | A | A | A | B |

In Table 1, the ingredients identified by compound name were commercially available reagents. The other ingredients were as follows.

Surfynol 104: An acetylene glycol surfactant, Nissin Chemical Industry

Black pigments: Prepared as follows.

The self-dispersible black pigment in Example 1 was prepared as follows.

Five hundred grams of powdered furnace carbon black (primary particle diameter, 250 nm; BET specific surface area, 180 m$^2$/g; DBP oil absorption number, 186 mL/100 g) was added to 3750 g of deionized water, and the resulting mixture was heated to 50° C. with stirring using a dissolver. The powder was then pulverized in a sand mill with 0.8-mm zirconia beads, and an aqueous solution of sodium hypochlorite (effective chlorine concentration, 12%) was added dropwise over 3.5 hours at 50° C. to 60° C. while the pulverization was ongoing. The powder was then pulverized for another 60 minutes in the sand mill, giving a reaction mixture containing a self-dispersible carbon black.

The reaction mixture was filtered through a 400-mesh metal screen to remove zirconia beads and unreacted carbon black. To the isolated reaction solution, a 5% aqueous solution of potassium hydroxide was added to adjust the pH to 7.5. The solution was then desalted and purified to an electrical conductivity of 1.5 mS/cm using an ultrafiltration membrane. The purified solution was further desalted and purified to an electrical conductivity of 1.0 mS/cm using an electrodialyzer. The resulting solution was concentrated to a self-dispersible carbon black concentration of 17% by weight. The concentrated solution was centrifuged to remove coarse particles and filtered through a 0.6-µm filter. Deionized water was added to dilute the filtrate to a self-dispersible carbon black concentration of 15% by weight. Then the carbon black was dispersed, giving a liquid dispersion of a self-dispersible carbon black for use in Example 1.

The self-dispersible black pigments in Examples 2 to 8 and 10 to 14 and Comparative Examples 1 to 4 were also prepared in the same way. The duration of pulverization was changed according to the particle diameter specified in Table 1.

The resin-dispersed black pigment in Example 9 was prepared as follows.

The following materials were put into a fully nitrogen-purged reactor, and polymerization was initiated at 75° C. with stirring: 20 parts by mass of organic solvent (methyl ethyl ketone), 0.03 parts by mass of chain transfer agent (2-mercaptoethanol), a polymerization initiator, 15 parts by mass of polypropylene glycol monomethacrylate (9 propylene oxide groups), 15 parts by mass of poly(ethylene glycol-propylene glycol) monomethacrylate (7 propylene oxide groups and 5 ethylene oxide groups), 12 parts by mass of methacrylic acid, 50 parts by mass of styrene monomer, 10 parts by mass of styrene macromer, and 10 parts by mass of benzyl methacrylate. To the resulting mixture, a solution of 0.9 parts by mass of 2,2'-azobis(2,4-dimethylvaleronitrile) in 40 parts by mass of methyl ethyl ketone, both per 100 parts by mass of the monomer components, was added. The resulting mixture was aged at 80° C. for 1 hour to give a polymer solution.

Then 7.5 parts by mass of the resulting water-insoluble polymer was dissolved in 45 parts by mass of methyl ethyl ketone. A predetermined amount of a 20% aqueous solution of sodium hydroxide (neutralizing agent) was added to neutralize salt-forming groups. Using a bead mill, the resulting mixture was kneaded with 20 parts by mass of commercially available carbon black MA8 (trade name, Mitsubishi Chemical) for 2 hours. The resulting paste was stirred with 120 parts by mass of deionized water, methyl ethyl ketone was removed at 6° C. under reduced pressure, and part of water was removed. This gave a liquid dispersion of a resin-dispersed carbon black for use in Example 9, with a solids concentration of 20% by mass.

The SPs of the organic solvents with an SP of 9 or more are as follows.

Glycerol: 16.7
Triethylene glycol: 13.5
1,2-Hexanediol: 12.1
Diethylene glycol monomethyl ether: 10.7
Triethylene glycol monobutyl ether: 9.93
Diethylene glycol monohexyl ether: 9.7
Trimethylolpropane: 14.4

Table 1 also includes the position of the ink encasement used in testing. "ON" refers to "on carriage," which means the ink encasement was mounted on a carriage as in the above embodiment. "OFF" refers to "off carriage," which means the ink encasement was not mounted on a carriage. In this case the ink encasement was attached to the body of a recording apparatus, and the ink composition therein was supplied to a recording head on a carriage through a tube.

Table 1 also includes the initial viscosity of the ink composition, or the viscosity of the freshly prepared ink composition, measured under 20° C. conditions using MCR-300 rheometer (trade name, Physica). In addition, the ratio of the volume of the liquid phase to that of the gas phase inside the ink-encasing chamber when the ink encasement was full is presented in Table 1 as a measure of the relative amount of encased ink composition to the encasement.

Although not presented in the table, the ink compositions of the Examples all came into contact at an angle of 40° or less with an inner wall of the ink tank used in the testing described below.

3.2. Testing

The ink compositions of the Examples and Comparative Examples were tested as follows.

3.2.1. Equipment

In Examples 1 to 14 and Comparative Examples 1, 2, and 4, an ink jet printer (trade name "PX-S170T," Seiko Epson Corporation) was modified to make a test printer that had multiple ink tanks (ink encasements) immobilized on a carriage. The ink tanks were made of polypropylene and each had an ink fill port.

In Comparative Example 3, Seiko Epson Corporation's EW-M770T was used. EW-M770T has ink encasements on its body, and ink compositions therein are transported to a recording head on the carriage through a tube.

One of these test printers was loaded with the ink composition of the assigned Example or Comparative Example, and printing jobs were performed.

3.2.2. Image Quality

The ink composition of the Example or Comparative Example was loaded into the assigned ink jet printer, and a solid pattern was printed on one sheet of an A4 recording medium (trade name "Xerox P," Xerox) everyday for 3 months. The reflective optical density (OD) of the 3-month and baseline (immediately after loading) solid patterns was measured using a GretagMacbeth colorimeter (GretagMacbeth) with a D50 light source and a field of view of 2° for observation. Based on the measured ODs, image quality was graded according to the criteria below. The results are presented in Table 1.

A: The percentage decrease in OD from the baseline is 3% or less.

B: The percentage decrease in OD from the baseline is more than 3% and 6% or less.

C: The percentage decrease in OD from the baseline is more than 6% and 10% or less.

D: The percentage decrease in OD from the baseline is more than 10%.

3.2.3. Percentage Decrease in Absorbance

The ink composition of the Example or Comparative Example was loaded into the assigned ink jet printer and left in that state. Three months later, the carriage was moved back and forth 20 times, the supernatant in the ink encasement was sampled, and the absorbance (Abs.) of the sample was measured. The percentage decrease in absorbance from baseline was determined and graded according to the criteria below. The results are presented in Table 1 as "% decrease in absorbance." Grade A or B indicates that the precipitation of the colorant was successfully controlled and can be deemed evidence of beneficial effects.

A: The percentage decrease in absorbance is less than 1%.

B: The percentage change in absorbance is 1% or more and less than 2%.

C: The percentage change in absorbance is 2% or more and less than 3%.

D: The percentage change in absorbance is 3% or more.

3.2.4. Initial Color Strength (Initial OD)

The ink composition of the Example or Comparative Example was loaded into the assigned ink jet printer, and a solid pattern was printed on an A4 recording medium (trade name "Xerox P," Xerox) immediately. The reflective OD of the pattern was measured using a GretagMacbeth colorimeter (GretagMacbeth) with a D50 light source and a field of view of 2° for observation. Based on the measured OD, initial color strength was graded according to the criteria below. The results are presented in Table 1. Grade A or B indicates that the color was strong and can be deemed evidence of beneficial effects.

A: The OD is 1.9 or more and less than 2.0.

B: The OD is 1.8 or more and less than 1.9.

C: The OD is 1.7 or more and less than 1.8.

3.2.5. Bleeding

The ink composition (black ink) of the Example or Comparative Example was loaded into the assigned ink jet printer, and a pattern of side-by-side yellow and black images was printed on an A4 recording medium (trade name "Xerox P," Xerox) immediately. The boundary between the images formed by the two inks was visually inspected for bleeds, and bleeding was graded according to the criteria below. The results are presented in Table 1.

The yellow ink was prepared in the same way as the ink composition of Example 1, except that the pigment was changed to C.I. Pigment Yellow 74. Grade A or B indicates that bleeding was effectively prevented and can be deemed evidence of beneficial effects.

A: Both visual inspection and microscopic observation find no bleed.

B: Visual inspection finds no bleed, but microscopic observation finds bleeds.

C: Visual inspection finds bleeds.

3.2.6. Storage Stability

The inks of the Examples and Comparative Examples were put into sealable storage bottles, and the bottles were left under 60° C. conditions for 2 weeks. The viscosity of the stored inks was measured, and storage stability was graded by comparing the measured viscosity with that of the freshly prepared inks (initial viscosity) according to the criteria below. The results are presented in Table 1.

A: The percentage change from the initial viscosity is less than ±1%.

B: The percentage change from the initial viscosity is ±1% or more.

3.2.7. Performance in Intermittent Printing

The ink composition of the Example or Comparative Example was loaded into the assigned ink jet printer, and the ejection stability of the composition in intermittent printing was assessed under the conditions of a temperature of 40° C. and a relative humidity of 20%. First, it was confirmed that the ink composition was successfully ejected through all nozzles. Then the ink composition was ejected onto A4 photographic paper (glossy photographic paper, Seiko Epson Corporation). After a 2-minute pause under the conditions of a temperature of 40° C. and a relative humidity of 20%, the ink jet ink composition was ejected again onto the A4 photographic paper. After the second ejection, the dot formed by the first drop of the ink composition attached to the A4 photographic paper was observed under an optical microscope for any displacement from its right position, and performance in intermittent printing was graded according to the criteria below. The results are presented in Table 1.

A: The displacement of the dot is 10 μm or less.

B: The displacement of the dot is more than 10 μm and 20 μm or less.

3.3. Test Results

The Examples were ink jet recording apparatuses that included an ink composition, an ink encasement in which the ink composition was encased, a recording head that was to eject the ink composition, and a carriage configured to move the recording head back and forth. The ink composition contained a disperse colorant, with the volume-average particle diameter of the disperse colorant being 110.0 nm or more and 200.0 nm or less, and at least one organic solvent with an SP of 9 or more, with the percentage thereof being 10.0% by mass or more. The carriage carried the ink encasement, with the ink encasement integrated with the carriage. The ink encasement had an ink fill port that opens and shuts as a port through which the ink composition was to be loaded. As shown in Table 1, in the Examples, the precipitation of the disperse colorant was successfully controlled, the color was strong, and bleeding was effectively prevented.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet recording apparatus comprising:
an ink composition;
an ink encasement in which the ink composition is encased;
a recording head that ejects the ink composition; and
a carriage configured to move the recording head back and forth, wherein:
the carriage carries the ink encasement, with the ink encasement integrated with the carriage;
the ink encasement has an ink fill port that is configured to open as a port when a user manually fills the encasement with the ink composition and shut after the ink composition has been manually loaded by the user; and
the ink composition contains a disperse colorant, with a volume-average particle diameter of the disperse colorant being 110.0 nm or more and 200.0 nm or less, and also contains at least one organic solvent with an SP of 9 or more, with a percentage thereof being 10.0% by mass or more.

2. The ink jet recording apparatus according to claim 1, wherein
the at least one organic solvent with an SP of 9 or more contained in the ink composition is one or two or more polyhydric alcohols and/or one or two or more alkylene glycol monoalkyl ethers.

3. The ink jet recording apparatus according to claim 2, wherein
the ink composition contains, as the one or two or more polyhydric alcohols, one or two or more polyhydric alcohols having two hydroxyl groups.

4. The ink jet recording apparatus according to claim 1, wherein
the ink composition contains an organic solvent with an SP of 9.9 or more and 13 or less.

5. The ink jet recording apparatus according to claim 1, wherein
the disperse colorant is a self-dispersible colorant.

6. The ink jet recording apparatus according to claim 1, wherein
a ratio of a volume of a liquid phase to a volume of a gas phase inside the ink encasement is 9 or less.

7. The ink jet recording apparatus according to claim 1, wherein
a viscosity at 20° C. of the ink composition is 3.5 mPa·s or more.

8. An ink composition comprising:
a disperse colorant, with a volume-average particle diameter of the disperse colorant being 110.0 nm or more and 200.0 nm or less; and
at least one organic solvent with an SP of 9 or more, with a percentage thereof being 10.0% by mass or more,
the ink composition being for use with an ink jet recording apparatus that includes an ink encasement in which the ink composition is encased, a recording head that ejects the ink composition, and a carriage configured to move the recording head back and forth,
the carriage carrying the ink encasement, with the ink encasement integrated with the carriage, and
the ink encasement having an ink fill port that is configured to open as a port when a user manually fills the encasement with the ink composition the ink composition and shut after the ink composition has been manually loaded by the user.

9. An ink jet recording method in which an ink jet recording apparatus is used that includes, an ink composition, an ink encasement in which the ink composition is encased, a recording head that ejects the ink composition, and a carriage configured to move the recording head back and forth,
the carriage carrying the ink encasement, with the ink encasement integrated with the carriage,
the ink encasement having an ink fill port that is configured to open as a port when a user manually fills the encasement with the ink composition and shut after the ink composition has been manually loaded by the user,
the ink composition containing a disperse colorant, with a volume-average particle diameter of the disperse colorant being 110.0 nm or more and 200.0 nm or less, and
also containing at least one organic solvent with an SP of 9 or more, with a percentage thereof being 10.0% by mass or more,
the method comprising ejecting the ink composition from the recording head to attach the ink composition to a recording medium.

* * * * *